United States Patent
Bier et al.

(10) Patent No.: US 12,114,386 B2
(45) Date of Patent: *Oct. 8, 2024

(54) BUILDING ENVIRONMENTAL SENSOR METHOD AND SYSTEM FOR COLLECTING DATA FROM SAME

(71) Applicant: Xerox Corporation, Norwalk, CT (US)

(72) Inventors: Eric Allan Bier, Palo Alto, CA (US); Alejandro E. Brito, Mountain View, CA (US); Shantanu Rane, Palo Alto, CA (US); Paloma Juanita Fautley, San Jose, CA (US)

(73) Assignee: Xerox Corporation, Norwalk, CT (US)

( * ) Notice: Subject to any disclaimer, the term of this patent is extended or adjusted under 35 U.S.C. 154(b) by 264 days.

This patent is subject to a terminal disclaimer.

(21) Appl. No.: 17/404,151

(22) Filed: Aug. 17, 2021

(65) Prior Publication Data
US 2023/0054574 A1    Feb. 23, 2023

(51) Int. Cl.
*H04W 76/19* (2018.01)
*H04W 4/80* (2018.01)
(Continued)

(52) U.S. Cl.
CPC ............ *H04W 76/19* (2018.02); *H04W 4/80* (2018.02); *H04W 76/15* (2018.02); *H04W 84/18* (2013.01)

(58) Field of Classification Search
CPC ....... H04W 76/19; H04W 76/15; H04W 4/80; H04W 84/18; H04L 67/12;
(Continued)

(56) References Cited

U.S. PATENT DOCUMENTS

| 5,165,064 A | 11/1992 | Mattaboni |
| 5,535,331 A | 7/1996 | Swoboda et al. |

(Continued)

FOREIGN PATENT DOCUMENTS

| CN | 106687773 | 5/2017 |
| CN | 207662867 | 7/2018 |

(Continued)

OTHER PUBLICATIONS

Chakrabarti et al., "Using Predictable Observer Mobility for Power Efficient Design of Sensor Networks", 2003, Springer-Verlag Berlin Heidelberg (Year: 2003).*

(Continued)

*Primary Examiner* — Ricky Q Ngo
*Assistant Examiner* — David M Kayal
(74) *Attorney, Agent, or Firm* — Fox Rothschild LLP

(57) ABSTRACT

A building environmental sensor includes a sensing element for collecting measurements of environmental parameters such as temperature, humidity, light, sound or the absence or presence of gas. The sensor will: (a) detect that a data collection device is within a communication range of the sensor; (b) generate a data stream that includes the data that the sensor collected; (c) transmit the data stream to the first data collection device; (d) determine that a communication link between the sensor and the first data collection device was lost before the first data stream was fully transmitted; (e) detect that a second data collection device is within the communication range of the sensor; (f) generate a second data stream that includes the remaining data; and (g) transmit the second data stream to the second data collection device.

18 Claims, 5 Drawing Sheets

(51) Int. Cl.
*H04W 76/15* (2018.01)
*H04W 84/18* (2009.01)

(58) Field of Classification Search
CPC ... H04L 12/12803; H04L 1/0041–0045; H04L 63/12–126; H04L 2012/284; H04L 2012/2841; H04L 12/2823; H04L 12/283; H04L 12/2838; F24F 2110/00; F24F 2110/10–72; Y02B 30/00–70; Y02B 40/00; G08C 2200/00; G05B 13/00; G05B 23/00; G05B 23/02; G05D 23/19–2033; G06F 9/4862; Y02D 30/00–70

See application file for complete search history.

(56) References Cited

U.S. PATENT DOCUMENTS

| | | | |
|---|---|---|---|
| 9,069,357 | B2 | 6/2015 | Hsu et al. |
| 9,144,360 | B2 | 9/2015 | Ozick et al. |
| 9,568,519 | B2 | 2/2017 | Hwang et al. |
| 9,800,431 | B2 | 10/2017 | Vollmer et al. |
| 9,881,342 | B2 | 1/2018 | Helitzer et al. |
| 9,974,612 | B2 | 5/2018 | Pinter et al. |
| 10,042,341 | B1 | 8/2018 | Jacob |
| 10,250,955 | B2 | 4/2019 | Schwartz et al. |
| 10,281,166 | B1 | 5/2019 | Hutz |
| 10,343,283 | B2 | 7/2019 | Pinter et al. |
| 10,380,863 | B2 | 8/2019 | Wedig et al. |
| 10,399,223 | B2 | 9/2019 | Wang et al. |
| 10,405,070 | B2 | 9/2019 | Schwarzkopf et al. |
| 10,518,414 | B1 | 12/2019 | Cui et al. |
| 10,562,184 | B2 | 2/2020 | Yamamoto et al. |
| 10,598,493 | B2 | 3/2020 | Zhu |
| 11,163,319 | B2 | 11/2021 | Tuukkanen et al. |
| 2004/0193957 | A1 | 9/2004 | Swoboda et al. |
| 2004/0250150 | A1 | 12/2004 | Swoboda et al. |
| 2005/0057370 | A1* | 3/2005 | Warrior ............ H04W 52/0216 455/11.1 |
| 2012/0143516 | A1 | 6/2012 | Mezic |
| 2012/0247203 | A1* | 10/2012 | Zhang ................. G01N 27/223 73/335.04 |
| 2012/0305661 | A1* | 12/2012 | Malchiondo ............ F24F 11/46 236/44 A |
| 2013/0109406 | A1 | 5/2013 | Meador et al. |
| 2015/0229488 | A1 | 8/2015 | Averitt |
| 2015/0351084 | A1* | 12/2015 | Werb ..................... H04W 12/08 370/329 |
| 2017/0270615 | A1* | 9/2017 | Fernandes ............ G08G 5/0039 |
| 2018/0235060 | A1* | 8/2018 | Vendetti ................ H04W 72/53 |
| 2018/0293864 | A1 | 10/2018 | Wedig et al. |
| 2019/0368758 | A1 | 12/2019 | Aller et al. |
| 2020/0043329 | A1 | 2/2020 | O'Callaghan |
| 2020/0103529 | A1 | 4/2020 | Yeon et al. |
| 2020/0226426 | A1 | 7/2020 | Jarquin Arroyo et al. |
| 2020/0379947 | A1 | 12/2020 | Kagan et al. |
| 2021/0019484 | A1 | 1/2021 | Ladan et al. |
| 2021/0046650 | A1 | 2/2021 | Deyle et al. |
| 2021/0103260 | A1 | 4/2021 | Khurana et al. |
| 2022/0030402 | A1* | 1/2022 | Bartholic ............ G06F 13/4282 |
| 2022/0154954 | A1* | 5/2022 | Sinur ...................... F24F 11/89 |

FOREIGN PATENT DOCUMENTS

| | | | | |
|---|---|---|---|---|
| EP | 2589943 | A1 * | 5/2013 | ............. F03D 17/00 |
| EP | 3456157 | | 3/2019 | |
| JP | 2017182333 | | 10/2017 | |
| WO | 2016154306 | | 9/2016 | |

OTHER PUBLICATIONS

Di Francesco et al., "Data Collection in Wireless Sensor Networks with Mobile Elements: A Survey", 2011, ACM Trans. Sen. Netw. 9, 1, Article 7. (Year: 2011).*

U.S. Appl. No. 17/404,142, filed Aug. 17, 2021, Method and System for Collecting Sensor Data in Buildings.

U.S. Appl. No. 17/404,159, filed Aug. 17, 2021, Method and System for Commissioning Environmental Sensors.

Bhadauria, D. et al., "Robotic Data Mules for Collecting Data over Sparse Sensor Fields", Journal of Field Robotics (2011) 28(3):388-404.

Jin, M. et al., "Automated Mobile Sensing: Towards High-Granularity Agile Indoor Environmental Quality Monitoring", Building and Environment 127 (2018) 268-276.

LaMarca, A. et al., "Making Sensor Networks Practical with Robots", In: Mattern F., Naghshineh M. (eds) Pervasive Computing. Pervasive 2002. Lecture Notes in Computer Science, vol. 2414. Springer, Berlin, Heidelberg.

Mantha, B.R.K et al., "Robotic Data Collection and Simulation for Evaluation of Building Retrofit", Automation in Construction 92 (2018) 88-102.

Nguyen, C. et al., "Wireless Sensor Nodes for Environmental Monitoring in Internet of Things", IEEE (2015).

Nguyen, M. et al., "Collaborative and Compressed Mobile Sensing for Data Collection in Distrubuted Robotic Networks", DOI 10.1109/TCNS.2017.2754364, IEEE (2017).

Information about Related Patents and Patent Applications, see section 4 of the accompanying Information Disclosure Statement Letter, which concerns Related Patents and Patent Applications.

* cited by examiner

BUILDING ENVIRONMENTAL SENSOR METHOD AND SYSTEM FOR COLLECTING DATA FROM SAME

BACKGROUND

In recent years, many types of electronic sensors have become more accurate and less expensive. With such sensors, it is becoming possible to contemplate improvements to the heating, ventilation, and air conditioning (HVAC) systems of buildings that improve the comfort of building occupants, reduce the power consumption of buildings or both. Buildings now account for a significant fraction of the world's total energy consumption, resulting in high energy costs for tenants and property owners, as well as damage to the environment from the processes of procuring, transforming, delivering, and consuming the associated energy. Reducing this energy use would be a significant benefit.

In order to reduce the energy consumption of buildings while preserving the comfort of its occupants, it is helpful to have detailed data on various parameters of the interior environment of the building, including temperature, humidity, sound, carbon dioxide, volatile organic compounds, and so on. Getting detailed data may require placing many sensors in a single building, such as a temperature sensor in each office, meeting room, and open space, for example.

If sensors are placed during the initial construction of a building, wired sensors can be used, with wires running through the walls that deliver the data to a centralized data store, such as a building management system (BMS), a supervisory control and data acquisition (SCADA) system or database.

However, it is also desirable to be able to add sensors to a building after construction is complete. This is true because sensor technology is constantly changing, making it possible to add more sensors or more kinds of sensors to existing buildings.

When adding sensors to an existing building, installation costs can be significantly reduced by using sensors that do not require running wires through the walls of the building. For example, sensors are now available that run on batteries and communicate their data wirelessly via protocols such as Wi-Fi, Bluetooth, and ZigBee.

Older buildings may also present challenges to some kinds of wireless sensors; for example, walls of older buildings can interfere significantly with wireless signals, making it harder to download the data from these sensors.

However, using wireless sensors creates a different problem. Building managers need a way to collect the data from the sensors so that it can be persisted in a data store. Many low-cost sensors have only a small amount of memory on the sensor itself, perhaps enough to store data for a week or month. If the data is not offloaded during that period of time, the sensor will delete older data in order to collect new data, and the older data will be lost. To prevent data loss, a reliable way to collect the data from all such sensors in a building, and to do so often enough that no data is lost, is needed.

SUMMARY

In some embodiments, a system for collecting building environmental sensor data includes a first data collection device having a processor, a first transceiver that is configured to receive data from proximate building environmental sensors using a short-range or near-field communication protocol, a second transceiver that is configured to communicate with an external service; and a local or remote memory containing programming instructions. The instructions are configured to cause the processor to: (a) upon detecting that the first transceiver is within a receiving range of a first building environmental sensor, communicatively connect with the first building environmental sensor via the short range or near-field communication protocol to receive a data stream that comprises sensor data captured by the first building environmental sensor; (b) continue to receive the data stream until the first transceiver either receives all of the sensor data or moves out of the receiving range, (c) repeat steps (a) and (b) for additional building environmental sensors; and (d) use the second transceiver to transfer the sensor data for each of the building environmental sensors to the external service.

Optionally, the system may include additional instructions to analyze the data stream as the data stream is received to identify, in the data stream: (i) a unique identifier for the first building environmental sensor; and (ii) indicia configured to enable the processor to determine when the first transceiver has received all of the sensor data from the first building environmental sensor. Optionally, the first data collection device may be a mobile robotic device; and if so then after communicatively connecting with the first building environmental sensor the data collection device may pause its motion until the device receives the indicia and determines that it has received all of the sensor data. The device will then resume motion after it determines that it has received all of the sensor data from the first building environmental sensor. Optionally, the indicia may include one or more of the following: (a) a message of completion which signals that delivery of all of the sensor data from the first building environmental sensor is complete; or (b) a message element that includes a data stream size for the data stream that comprises the sensor data from the first building environmental sensor.

The system may include the first building environmental sensor and the additional building environmental sensors. Each such sensor will be configured to capture the sensor data, wherein the sensor data includes one or more of the following: temperature, humidity, sound, amount of light, motion, or presence of gas, Each sensor also may be configured to generate the indicia by one or more of the following: (a) appending a message of completion to an end of the data stream; or (b) appending a message of data stream size to a beginning of the data stream. The sensors may then transfer the data stream to the data collection device.

The system also may include a digital map with locations and unique identifiers for the first building environmental sensor and each of the additional building environmental sensors. The data collection device also may include additional programming instructions that are configured to cause its processor to, after it either receives all of the sensor data from the first building environmental sensor or moves out of the receiving range of the first building environmental sensor: (i) identify a second sensor for which the first data collection device has not yet received sensor data; (iii) extract, from the digital map, the location of the second sensor, and (iii) either: (a) cause a display of the first data collection device to output a section of the digital map that includes the second data collection device along with information for navigating to the second sensor, or (b) cause a motion control system of the first data collection device to automatically move the data collection device toward the second sensor.

The system also may include a second data collection device with a second data store that includes the digital map, and also instructions that are configured to cause the second data collection device to receive data streams from some of the additional sensors, and to transfer the received data streams to a remote service. In this embodiment, the programming instructions of the first data collection device that are to identify the second sensor may include instructions that are configured to cause the first data collection device to: (i) examine data received from the remote service to identify one of the additional sensors for which the remote service has not yet received a data stream from the second data collection device; and (ii) select the identified additional sensor as the second sensor.

Optionally, the system may include a digital map with locations and unique identifiers for the first building environmental sensor and each of the additional building environmental sensors. The system may also include instructions to cause the processor to, after the first data collection device either receives all of the sensor data or moves out of the receiving range of the first building environmental sensor: access the digital map to identify a second sensor for which the first data collection device has not yet received sensor data, and which is most proximate to the first data collection device of all sensors for which the first data collection device has not yet received sensor data; and cause a motion control system of the first data collection device to automatically move the first data collection device toward the second sensor.

Optionally, some of the various sensors many each have transceivers that are designed to operate using different communication protocols. If so, then when the data collection device communicatively connects with a sensor it may select, from a set of various available receivers of the data collection device, a receiver that uses a protocol matching a communication protocol used by the applicable sensor. In addition, the data collection device may use yet another transceiver to transfer the sensor data to the external service using a communication protocol of the external service to transfer the data to the external service.

Optionally, the building environmental sensors may include different types of sensors that generate data according to different formats, If so, then the data collection device may, in response to receiving the data stream, extract the sensor data from the data stream and save the sensor data to a data store as commonly-formatted data.

In other embodiments, a building environmental sensor includes a sensing element for collecting measurements of one or more of the following parameters of an environment in which the sensing element is present: temperature, humidity, light, sound or the absence or presence of a gas. The sensor also includes a data store for storing data that is collected by the sensing element. The sensor also includes a transmitter configured to transfer data according to a communication protocol. The sensor also includes a memory containing programming instructions that are configured to cause the processor to: (a) detect that a first data collection device is within a communication range of the sensor; (b) generate a first data stream that includes the data stored in the data store; (c) transmit the first data stream to the first data collection device; (d) determine that a communication link between the sensor and the first data collection device was lost before the first data stream was fully transmitted to the first data collection device; (e) save an indicia that identifies remaining data in the data store that was not delivered to the first data collection device; (f) detect that a second data collection device is within the communication range of the sensor; (g) generate a second data stream that includes the remaining data; and (h) transmit the second data stream to the second data collection device. The first and second data collection devices may be the same device, or they may be different devices.

Optionally, the sensor may include additional programming instructions configured to generate and include in a first data stream a message that includes an indicator that a second data collection device can use to determine when the first data collection device has received a complete transmission of the data stored in the data store.

Optionally, the sensor may include additional programming instructions configured to receive local data from an onboard environmental sensor of the first data collection device, The local data may include environmental parameter values measured by the first data collection device while within the receiving range of the building environmental sensor. The sensor may compare the local data to sensor data captured by the sensing element to determine whether the local data and the data captured by the sensing element are consistent with each other. When the local data and the data captured by the sensing element are not consistent with each other, the sensor may generate a signal indicating that the sensor, the data collection device, or both may require maintenance.

In various embodiments, the building environmental sensor may be a temperature sensor with a sensing element that includes one or more of the following: a thermocouple; a bi-metallic thermostat; a thermistor; or a resistive temperature detector. Alternatively or in addition, the building environmental sensor may be a humidity sensor, and the sensing element may include a strip of metal oxide that is positioned between two electrodes. Alternatively or in addition, the building environmental sensor may be a gas detection sensor and the sensing element may include: an electrochemical sensor with sensing electrodes; an infrared transmitter and receiver; or a catalytic sensor with a coil that will oxidize when it contacts a combustible gas. Alternatively or in addition, the building environmental sensor may be a motion sensor with a sensing element that includes a passive infrared transmitter and receiver.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

Additional terms that are relevant to this disclosure will be defined at the end of this detailed description section.

Figure 1:
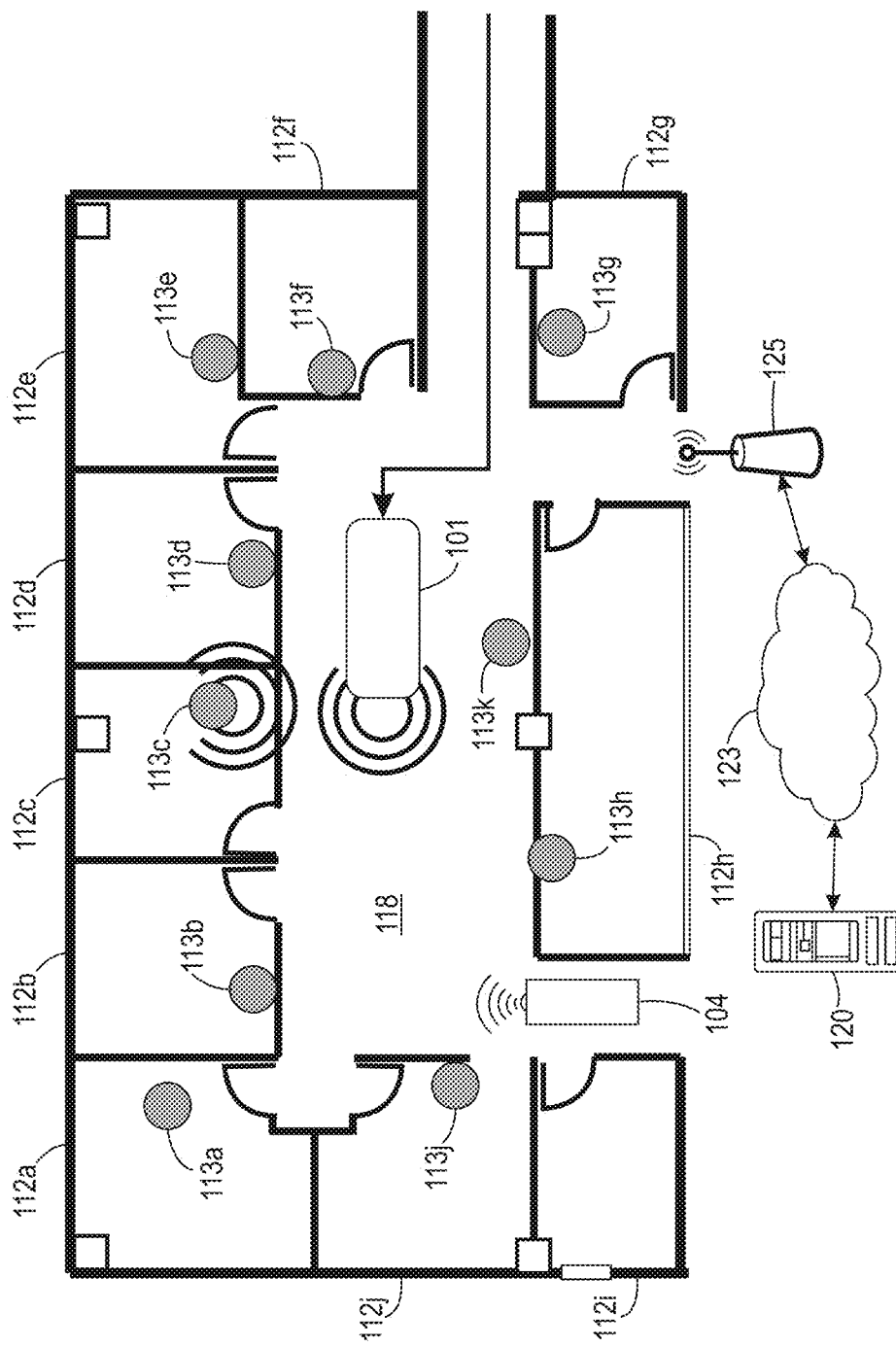
FIG. 1 illustrates an example building layout with environmental sensors and an electronic data collection device.
Figure 2:
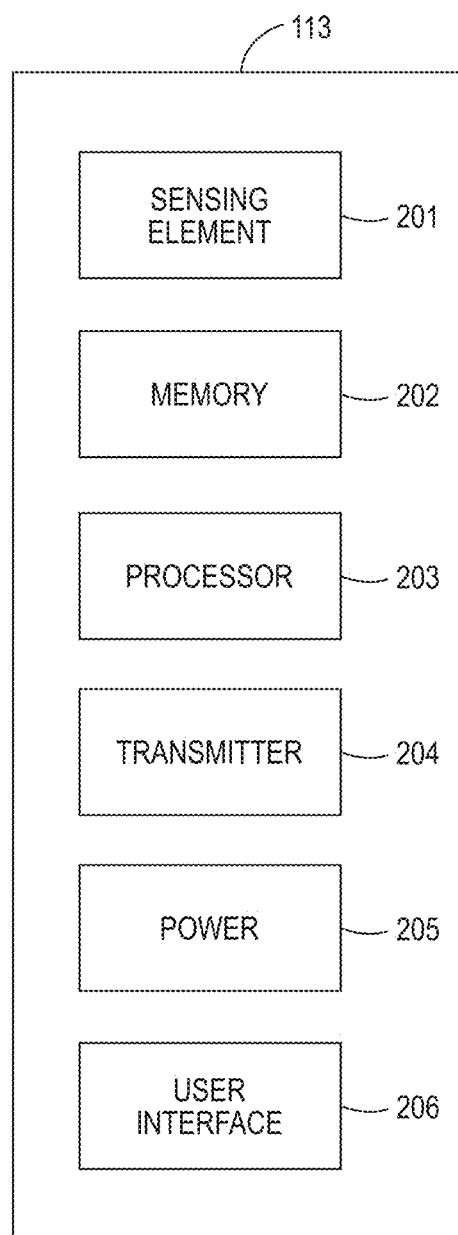
FIG. 2 is a block diagram that illustrates example components of a building environmental sensor.

FIG. 1 illustrates an example building layout with multiple rooms 112a ... 112j and a corridor 118 that leads to the entrances of each room. Returning to FIG. 1, a data collection device 101 moves through the facility and captures data from any number of environmental sensors 113a ... 113k that are installed in rooms, the corridors or other building areas. The sensors may be attached to or integral with: (i) a wall, ceiling, floor of the room or corridor; or (ii) furniture or other items within the room or corridor. Alternatively some of the sensors may be freestanding sensors that are not attached to any particular element of the room or corridor. The sensors may be temperature sensing devices, light sensors, humidity sensors, gas detection sensors, sound pressure or other audio sensors, motion sensors and/or other sensors. Regardless of type, referring to FIG. 2 each environmental sensor 113 will have a sensing element 201, memory 202, a processor 203, a transmitter 204, and a power source 205. Optionally, the sensor also may include a user interface 206 such as a display, an audio speaker and/or one or more indicator lights for displaying measured parameters, status messages (such as messages indicating that maintenance is required), or other messages.

If sensor 113 is a temperature sensor, the sensing element 201 may include, for example, a thermocouple, bi-metallic thermostat, thermistor or resistive temperature detector (RTD). If sensor 113 is a light sensor, the sensing element 201 may include, for example, a photo-emissive or photo-conductive cell, a light dependent resistor, a photo-voltaic cell, a photojunction device such as a photodiode or phototransistor, or other device. Other types of sensors are possible. If sensor 113 is a humidity sensor, the sensing element 201 may include, for example, a capacitive sensor that includes a thin strip of metal oxide between two electrodes. If sensor 113 is a gas detection sensor, the sensing element 201 may include, for example, an electrochemical sensor with sensing electrodes that are capable of measuring carbon monoxide or other gases, an infrared transmitter and receiver that compares transmitted light to reflected and received light to determine whether differences between the two light streams indicate that a hydrocarbon gas may be present, or a catalytic sensor with a coil that oxidizes when it comes in contact with a combustible gas. If sensor 113 is a motion sensor, the sensing element 201 may include, for example, a passive infrared sensor transmitter and receiver that compares transmitted light to reflected and received light to determine whether a moving object is interfering with the light paths. Other types of sensors may be used.

The power source 205 of the sensor 113 may include, for example, a battery, a solar panel, or a wire or other conductor that leads to an external power supply.

The memory 202 will include a device or segment (such as a memory sector) that stores data captured by the sensing element, along with a device or sector that stores programming instructions that the sensor's processor 203 will use to manage the data stored in the memory. To fit within a small structure, the memory 202 may be relatively small, and the programming instructions may be configured to manage the data in the memory in a format such as a queue or stack data structure. In such structures, new data may be stored at one end of the queue or the top of the stack, and older data may be shifted toward the second end of the queue or bottom of the stack as new data arrives. For example, FIG. 3 refers to a process by which the sensor captures and manages building environmental data. As the sensor captures new data at 301, the system deletes the oldest data from the second end of the queue or the bottom of the stack at 302 to make room for new data at the first end or the top. The system may then save the newly-captured data to the first end of the queue or the top of the stack at 303. Other example methods of data management may be used.

Returning to FIG. 2, the transmitter 204 of the sensor will be one designed to transmit data directly to other devices in an Internet-of-Things (IOT)-type arrangement using a relatively low-power, short-range data transmission protocol such as Bluetooth, Bluetooth low energy (BLE), Zigbee or Z-wave; a near-field communication (NFC) protocol such as one employed by radio frequency identification (RFID) tags; or another open or proprietary transmission protocol. In some embodiments, the system also may include a transmitter that is configured to transmit data via a local Wi-Fi network, although the system's data collection device (described below) will not necessarily communicate with the sensor via Wi-Fi transmissions. Regardless of the protocol used, the sensor's programming instructions may direct the processor to arrange the data to be transmitted according to the protocol. Returning to FIG. 3, the sensor and data collection device will communicatively connect at 304. The communicative connection may occur in any of several ways. For example, the sensor may detect a pairing request or other signal from the device when the sensor and device are in communication range of each other. Alternatively, the data collection device may transmit, and the sensor may receive, a query message that requests data from the sensor. In any of these or other methods of communicative connection, the sensor will assemble the stored data into data packets for transfer at 305, and the sensor will transfer the stored data to the data collection device at 306.

The programming instructions also may associate timestamps with stored data to identify when the data was captured. In addition, before or during a data transmission, at 305 the processor may generate a message with indicia that enables an external receiver to understand when all of the device's onboard data has been transmitted, and it may include the indicia in the message that it transmits at 306. The indicia may be, for example, a header message that either (a) follows the last data transmission and indicates that transmission is complete (i.e., which is a message of completion), or (b) precedes the first data transmission and includes a value indicating the amount of data (i.e., the data stream size) that the sensor has available to transmit. The message also may include a unique identification code for the sensor so that external receiver can use the identification code to identify the sensor from which it receives data. The sensor will include the message with the data stream of sensor data that it transfers to the data collection device at 306.

In some embodiments, if the sensor and the data collection device lose their communication link before the sensor has transferred all of its available data (at 309), the sensor, the data collection device, or both may store a tag or other identifier in its memory to identify where the data stream was interrupted, or it may otherwise store an indicator to identify what sensor data remains to be transferred. Then, when the sensor later establishes a communication link with the same or another data collection device, the may transfer the remaining sensor data to that data collection device at 310. The sensor may continue collecting new environmental data (at 301) when this is complete, and/or simultaneously while communications with any data collection devices occur.

Figure 3:
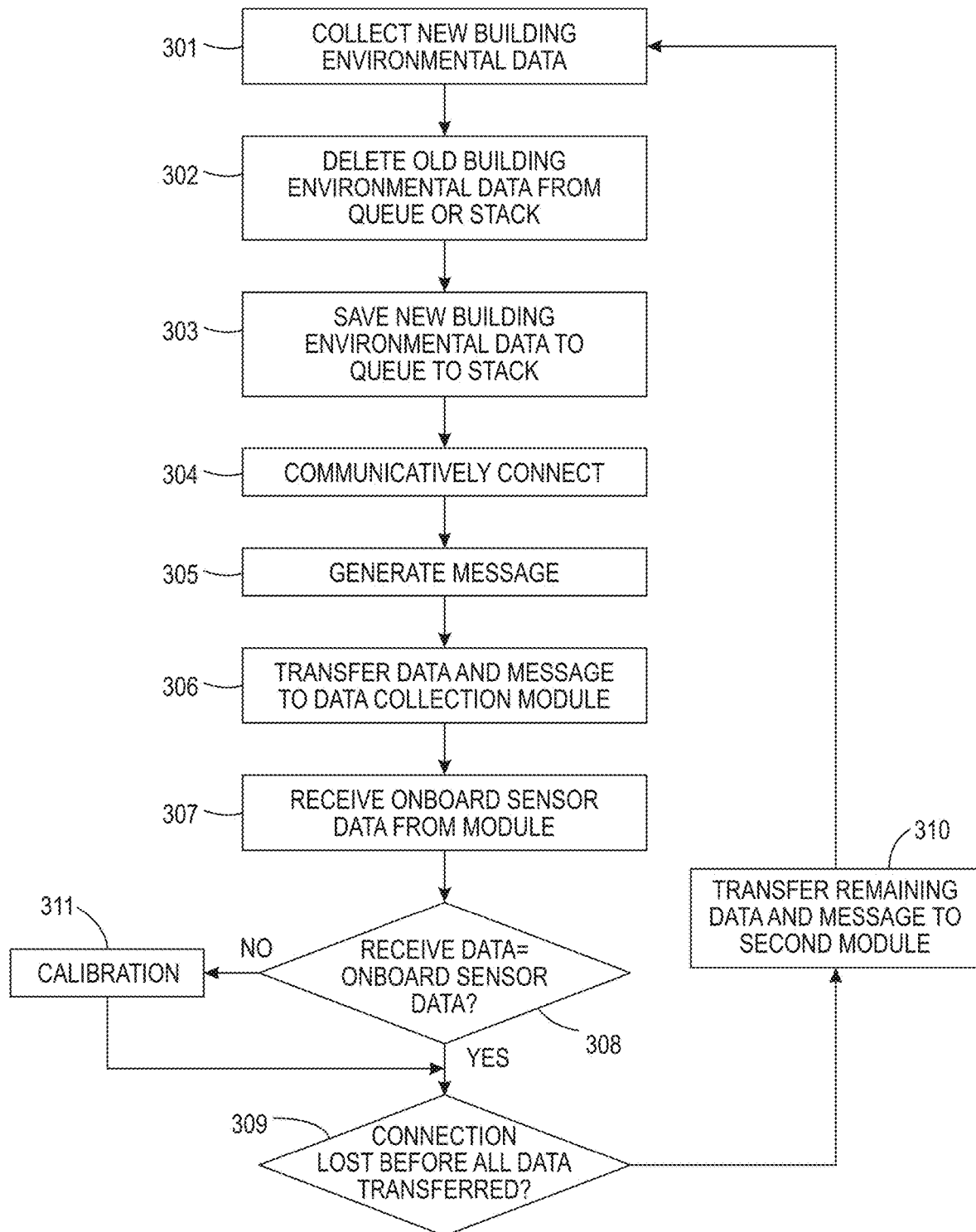
FIG. 3 is a flow diagram for a process by which a building environmental sensor may capture and manage data.

Additional elements of FIG. 3 will be discussed below after the discussion of FIG. 5.

Returning to FIG. 1, as noted above a data collection device 101 moves through the facility and captures data from the sensors 113*a* . . . 113*k*. The data collection device 101 may be a portable computing device such as a smartphone, tablet computer, or a dedicated data collection unit. The device may be carried by a person, or it may be carried by or integral with a robotic vehicle that automatically navigates the facility using a stored map and one or more positional sensors such as one or more cameras, and radar, sonar or LiDAR sensors. In some embodiments, a data collection system also may include a second data collection device 104, and any number of additional data collection devices, each of which collects sensor data as it moves through the building.

Each data collection device 101, 104 may include a first transceiver that is configured to communicate with the building sensors using any suitable communication protocol (such as BLE, Zigbee or Z-wave or another short-range communication protocol) when the device and the sensors are within communication range of each other. For example, in FIG. 1, data collection device 101 is proximate and in the communication range of sensor 113*c*. Each data collection device 101, 104 also may include a second transceiver that is configured to communicate with an external service such as server 120 via a wireless communication network 123. The wireless communication network 123 may be a cellular network in which the data collection device 101 or 104 communicates with a receiver that is outside of the building, and/or a local area network via which the data collection device 101 or 104 communicates via one or more wireless access points 125 located at various locations throughout the building.

Figure 4:
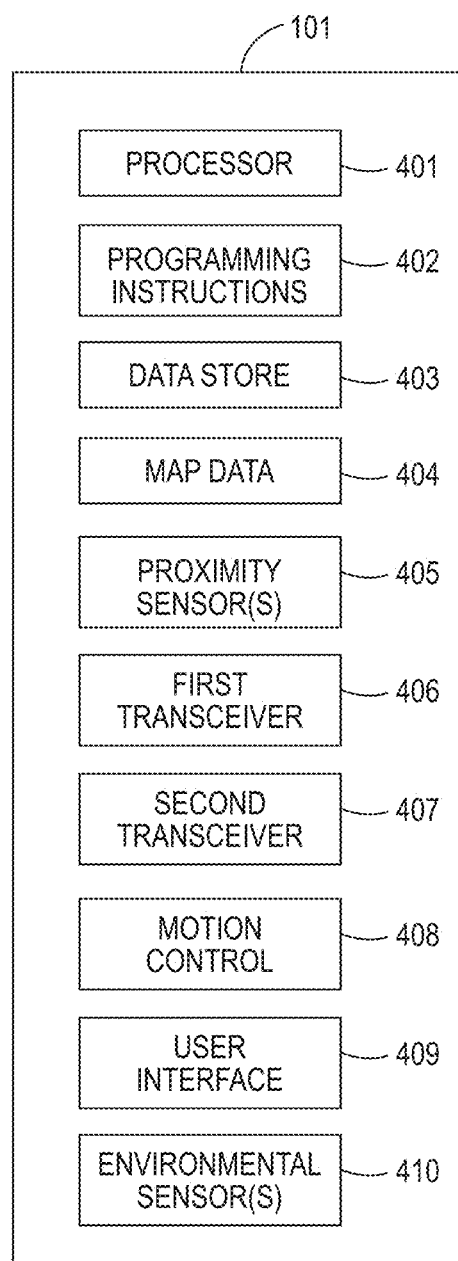
FIG. 4 is a block diagram that illustrates example components of an electronic data collection device.

FIG. 4 illustrates example components of a data collection device 101. The data collection device will include a processor 401 and a memory with programming instructions 402 for instructing the processor to perform the methods described in this document. The device 101 also will include a data store for storing sensor data that the device receives from proximate building environmental sensors. A first transceiver 406 will be configured to receive the data by communicating with the proximate sensors via a short-range communication protocol or another suitable communication protocol as described above. A second transceiver 407 will be configured to transfer data to an external service, such as via a Wi-Fi or cellular network. Additional transceivers may be included, each of which is configured to receive data transmitted via a different transmission protocol from the first and second transceiver. The data collection device also may include a user interface 409 for outputting information to the device's user and/or receiving information from the user. By way of example, the user interface 409 may include a display device on which the system may output a map, navigation instructions or other information. The user interface may output information about the status of sensor data collection, such as which sensors in the local area still need to be visited for data collection, and/or which have been visited recently enough that no additional data collection is needed at the present time. The user interface 409 also may include a speaker via which the system may audibly output navigation instructions or other information. In some embodiments, the data collection device also may include one or more environmental sensors 410 such as a temperature sensor, light sensor, humidity sensor, or gas detection sensor. Potential uses of the environmental sensors 410 will be discussed below in the context of FIG. 5.

In some embodiments, the data collection device may be a component of, or carried by, a mobile robotic device. A mobile robotic device will include motion control hardware components 408 such as wheels and a motor that, in response to commands from the processor, can cause the device to move through the building with minimal or no human intervention. A robotic device will store map data 404 in a memory or receive map data from an external service, and it will have one or more onboard proximity sensors 405 that are configured to detect features that are near the robotic device and within the environment in which the robotic device is traveling. Example proximity sensors 405 include a global positioning system (GPS) receiver, a camera, and/or radar, sonar or LiDAR sensors. The robotic device's processor 401 will process the map data 404 and the data received from onboard sensors to determine the robotic device's location within a facility and cause the robotic device to move throughout the facility. Any robotic devices and navigation processes that are now known or developed in the future may be used, such as those described in U.S. Pat. No. 10,562,184, the disclosure of which is fully incorporated into this document by reference.

Figure 5:
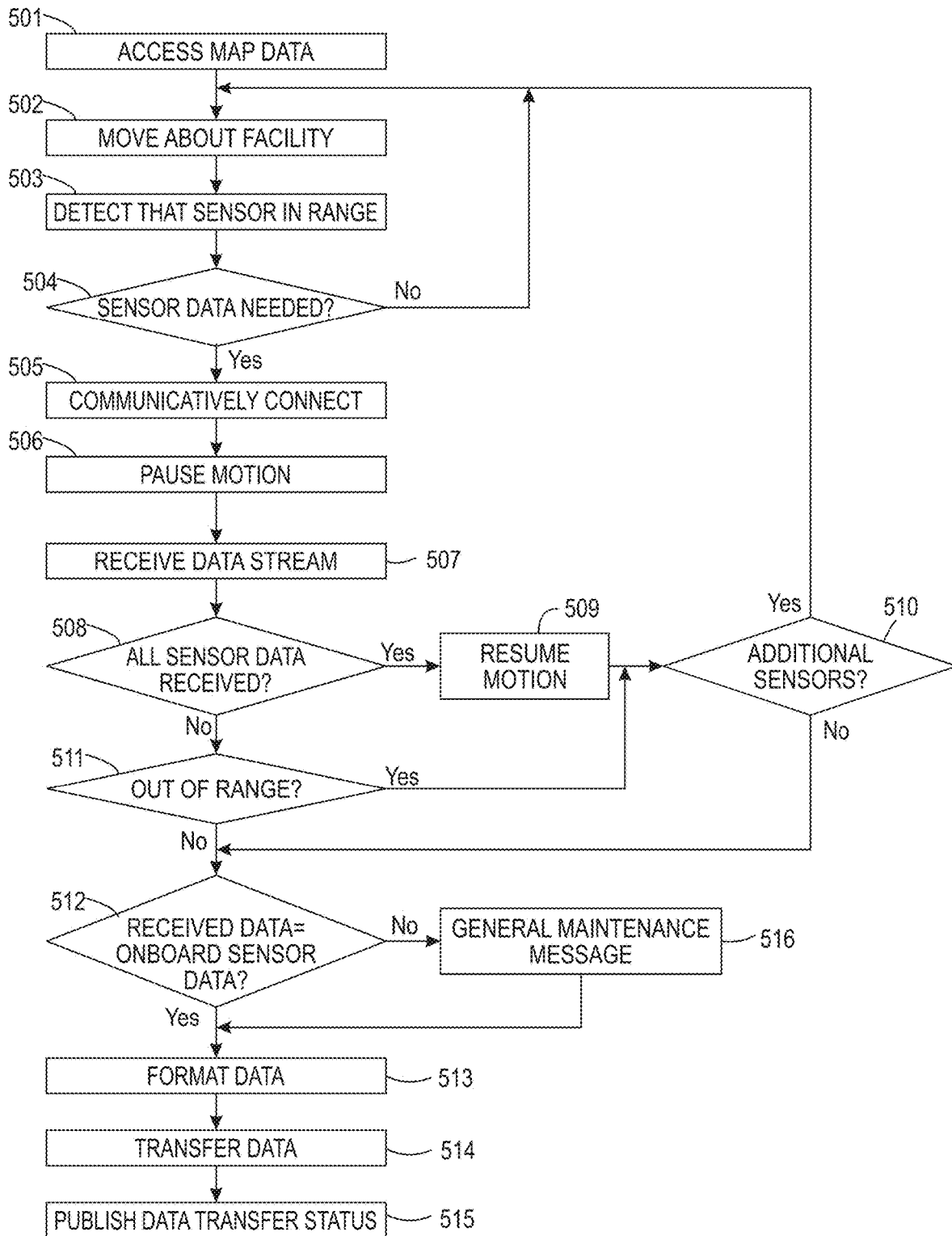
FIG. 5 is a flow diagram for a process by which a data collection device may collect and use data that the device receives from building environmental sensors.

FIG. 5 illustrates a process by which a data collection device may collect and use data that the device receives from building environmental sensors. At 502 the device will move throughout the facility. If the device is a portable electronic device such as a smartphone or electronic tablet, a user may carry the device through the facility. If the device is a mobile robotic device, the system may use any of the many robotic navigation processes that are known in the art to implement this step. A robotic device may access and use digital map data at 501 to enable such navigation. The map data may be stored onboard the robotic device in a data store, or the map data may be stored on an external system that communicates with the robotic device via a wireless communication link to a Wi-Fi network, a cellular communication network or another wireless network. Alternatively, or in addition, a robotic device may receive navigation commands from human operator via a user interface that is in communication with the robotic device.

As the data collection device moves around the facility, at 503 the device may detect that it has entered into communication range with one of the building's environmental sensors. The system may detect this in any suitable way, such as by (a) accessing sensor locations and communication ranges in the digital map data and determining whether the device's current location falls within a sensor's communication range; or (b) the sensor may broadcast messages (advertising packets) indicating that the sensor is available for communication, and the robotic device may determine that it is within communication range of the sensor when it detects the sensor's advertising packets. Once in range, at 505 the data collection device and sensor may establish a communicative connection according to the sensor's communication protocol. For example, if both devices use the Bluetooth protocol, the two devices' transceivers may pair with each other as according to that protocol. For other protocols, the communicative connection may simply occur by transmission of messages between the sensor and the data collection device.

Optionally, in embodiments that use multiple data collection devices, before or after establishing the communicative connection, at 504 the data collection device may assess whether it needs to collect data from that sensor. Processes by which the data collection device may do this will be described in more detail below.

Once the communicative connection is established, the sensor may transmit a data stream that includes the sensor data that is stored in the sensor's memory, and at 507 the data collection device may receive that data stream. If the data collection device is a robotic device, then optionally at 506 the device may automatically pause its motion when it detects that it is receiving or will receive sensor data. Alternatively, if the data collection device is a manually carried device, then at 506 it may use its user interface to output a message instructing the user to remain in place while the device collects data.

As the data collection device receives the data, at 508 the data collection device will periodically examine the data to determine whether it has received all of the sensor data that the sensor has available to transfer. For example, if the sensor published a header message that followed the last data transmission to indicate that transmission is complete, the data collection device may determine that it has received all of the sensor data when it receives the message of completion. Alternatively, if the sensor published a message indicating the data stream size and thus the amount of data that the sensor had available to transmit, the data collection device may determine that it has received all of the sensor's data when it has received that amount of data. Other methods are possible.

If the data collection device did not pause motion at 506, then as the data collection device keeps moving it may detect that it has moved out of the sensor's range at 511, such as by determining that it has lost its communicative connection with the sensor. If all sensor data is not yet received and the data collection device remains within the sensor's communication range, then the system will continue to receive the data stream at 505 until either of these conditions occur. If the device paused motion at 506, then when all sensor data is received 508 the collection device may resume its movement through the facility at 509, either automatically (if it is a robotic device) or by using its user interface to output an instruction to resume movement (if it is a manually carried device).

Once all of the sensor's data has been received or the collection device moves out of the communication range, then at 510 the data collection device may determine whether any additional sensors remain from which the collection device may collect data. The system may make this determination by accessing the map data that is stored in its onboard memory to determine whether or not it has data from all of the sensors that are in the map, or by querying an external service to determine whether the service instructs it to move to another sensor. If an additional sensor has data to be collected, the data collection device may extract the additional sensor's location from the map data and navigate to the sensor (if the device is a robotic device) and/or output the sensor's location via a user interface. If multiple sensors have data available for collection, the data collection device may review the map data to determine which of those sensors is most proximate to the data collection device, and it may move the data collection device to that nearby sensor. Alternatively, the data collection device may simply keep moving through the facility and scanning for additional sensors that are transmitting advertising packets to indicate that they are available for communication and/or when the sensors have data available to transfer.

At any point in the process, at 514 the data collection device may transfer the data that it received to an external service. The device may do this once it has received all of the sensor data that it will receive from a sensor and/or after the device has moved out of range of the sensor. Or, the device may store the data onboard and transfer the data to the external service in a batch communication after the device has collected data from multiple sensors. To communicate with the external service, the data collection device will typically not use the same transceiver as it used to communicate with the sensor, but instead will use a transceiver configured to communicate via a cellular communication network, a Wi-Fi network, a LoRa radio, or another type of wireless network. Alternatively or in addition, the device may include one or more communication ports that are configured to transfer data via a wired connection such as a docking station that physically connects to the data collection device and harvests data from the device.

In some situations, different types of sensors may format their data according to different formatting schemes. If so, then optionally before transmitting the data to the external service, at 513 the system may format the sensor data that it received from multiple sensors into a common format that can be understood by the external service. For example, the data collection device may add each sensor reading to a file in a common separated values format, in which each reading becomes a row in a table with a date, time, sensor unique id, temperature, humidity, signal strength, and sensor battery level. Other data structures may be used. Alternatively, the data collection device may store data from different sensors (or from different types of sensors) in separate files or database tables. Alternatively, the data collection device may simply transfer the data to the external service in the format in which the data was received, in which case the external service can parse and/or reformat the data as it may require.

In addition, after receiving data from any sensor, at 515 the data collection device may publish a data transfer status message that identifies the sensor from which it collected the data, a timestamp indicating a time at which it collected the data, and/or an indicator of whether all sensor data was received or any data remains to be collected. The data collection device may transmit this message to an external service and/or wirelessly broadcast it to other data collection devices in the building. Then, when another data collection device detects the sensor (at 503), it may access the published message to determine whether it should collect data from the sensor at 504. The other data collection device may make this determination in any of various ways, such as:

by examining the published message and identifying that the published message indicates that additional data remains to be collected;

by examining the published message and its timestamp and determining that it should collect data from that sensor if at least a minimum period of time has passed since the time of the timestamp, otherwise determining that it should not collect data from that sensor;

by querying a remote service to ask for a message indicating one or more additional sensors that have data that remains to be collected; or by receiving this determination from a message transmitted from the sensor itself, as discussed below in the context of steps 309-310 of FIG. 3.

If the other data collection device receives this determination from the sensor, then the order of step 504 in FIG. 5 may be changed so that it follows step 505, 506 or 507.

In other embodiments, the system may allow multiple data collection devices to collect all available data from any sensor, regardless of whether another data collection device already collected the data, to add redundancy to the data collection process. If so, then when all of the data collection devices transfer their data to the external service, the external service may analyze the incoming data and discard duplicate data so that the redundancy does not increase the external service's data storage requirements.

As another optional feature, if the data collection device includes an onboard sensor that collects the same type of data as the building's environmental sensor collects while the collection device is within the communication range of the building's sensor, then at 512 the data collection device or an external service may compare the data collected by its onboard sensor to that collected by the building's sensor to determine whether the measurements taken by the two sensors are consistent with each other. The measurements may be consistent with each other if they match or are within a threshold tolerance level of each other. If the measurements are not consistent, then at 516 the data collection device may generate a signal with a maintenance message indicating that the building sensor requires maintenance such as a calibration action. The data collection device may transfer the maintenance message to the external service with the data transfer, in a separate signal, or otherwise. The data collection device also may output the maintenance message via the user interface. Optionally, the system may require that the sensor and data collection device be in the same environmental zone before the system will perform the comparison at 512. To be in the same environmental zone, the system may require that the two devices be in the same room or corridor, and also be not more than a threshold distance away from each other. If the devices are not in the same environmental zone, then the system may skip the comparison (step 512) and simply perform data collection because the distance and/or physical barriers may result in environmental parameter differences between the two devices.

As another optional feature, in systems that use multiple data collection devices, the steps of comparing the building sensor data to onboard sensor data at 512 may be performed by multiple data collection devices. The system may then create an average, median or other aggregate value of all differences between the building sensor's values and the values measured by each of the collection device's onboard sensors and only generate a maintenance message (or generate a higher priority maintenance message) if the aggregate values from the building sensors are not within a threshold tolerance of the aggregate values of the data collection device onboard sensors. Alternatively, the system may perform the comparison after a sensor A has transferred data to two or more data collection devices B and C. In this situation, if the values reported by A, B and C are within a threshold tolerance level of each other, no action will be needed. However, if any one of A, B or C reports values that are more than the threshold tolerance level from the values reported by the other two devices, the system may determine that the device which reported the outlier value should be calibrated. The device that requires calibration could be the sensor A, or it be one of the data collection devices B or C. An outlier value doesn't necessarily mean that the device must be calibrated. (For example, an outlier value could have been resulted from the data collection device being far enough from the sensor to yield different environmental conditions.) However, at a minimum the report may suggest that the cause of the outlier value should be investigated. Any of these scenarios can help avoid false positive maintenance signals that may occur if, for example, one of the robots was too far from the building sensor to encounter similar environmental conditions, or perhaps separated from the building sensor by a wall or other obstacle.

As another optional feature, returning to FIG. 3, if the data collection device includes an onboard sensor that collects the same type of data as the building's environmental sensor collects while the collection device is within the communication range of the building's sensor, then the sensor may not only transmit data to the data collection device but also receive data from that device at 307. The received data may include data collected by the data collection device's onboard sensor while the data collection device is within the communication range. At 308 the sensor's processor may compare the data received from the collection device to that collected by the sensor itself to determine whether the measurements taken by the two sensors are consistent with each other. The measurements may be consistent with each other if they match or are within a threshold tolerance of each other. If the measurements are not consistent, then at 311 the data collection device may generate a signal with a maintenance message indicating that the building sensor, the data collection device, or both require maintenance such as a calibration action. The data collection device may transfer the maintenance message to the external service and/or the sensor with the data transfer, in a separate signal, or otherwise. The sensor also may output the maintenance message via a display, via an indicator light, or via another user interface on the sensor. In some cases, the message may be able to initiate the calibration. For example, the data collection device's message could inform the sensor that the proper reading at the present moment is 20.2 degrees Celsius, allowing the sensor to correct a mis-calibration Terminology that is relevant to this disclosure includes:

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. Electronic devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices that are data collection devices are discussed above in the context of FIG. 4.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A memory may contain programming instructions that are configured to cause a processor to execute any of the actions described above in this document. A computer program product is a memory device with programming instructions stored on it.

In this document, the terms "robotic device" and "robotic system" refer to an electronic device or system that includes a processor, programming instructions, and one or more physical hardware components that, in response to commands from the processor, can move with minimal or no human intervention. Through such movement, a robotic device may perform one or more automatic functions or function sets. Examples of such operations, functions or tasks may include, without limitation, operating wheels or propellers to effectuate driving, flying or other transportation actions, operating robotic lifts for loading, unloading, medical-related processes, construction-related processes, and/or the like. Example robotic devices may include, without limitation, delivery robots, autonomous vehicles, drones and other autonomous robotic devices. Robotic devices also may include semi-autonomous devices which can perform some automated navigation functions but whose navigation can also be directed by a human operator.

In this document, the term "transceiver" refers to a device that includes an antenna and other components that can transmit data to and/or receive data from one or more other devices via a wireless communication path.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A building environmental sensor, comprising:
    a sensing element for collecting measurements of one or more of the following parameters of an environment in which the sensing element is present: temperature, humidity, light, sound or the absence or presence of a gas;
    a data store for storing data that is collected by the sensing element;
    a processor;
    a transmitter configured to transfer data according to a communication protocol; and
    a memory containing programming instructions that are configured to cause the processor to:
        detect, in response to communicatively connecting with a first data collection device via a short-range communication or near-field communication (NFC) protocol, that the first data collection device is within a communication range of the building environmental sensor,
        generate a first data stream that includes the data stored in the data store,
        transmit the first data stream to the first data collection device,
        determine that a communication link between the building environmental sensor and the first data collection device was lost before the first data stream was fully transmitted to the first data collection device,
        save an indicia that identifies remaining data in the data store that was not delivered to the first data collection device,
        detect, in response to communicatively connecting with a second data collection device via the short-range communication or NFC protocol, that the second data collection device is within the communication range of the building environmental sensor,
        generate a second data stream that includes the remaining data, and
        transmit the second data stream to the second data collection device.

2. The building environmental sensor of claim 1 further comprising additional programming instructions configured to cause the processor to:
    generate a message that includes an indicator that a second data collection device can use to determine when the first data collection device has received a complete transmission of the data stored in the data store; and
    include the message in the first data stream.

3. The building environmental sensor of claim 1, further comprising additional programming instructions configured to cause the processor to:
    receive local data from an onboard environmental sensor of the first data collection device, wherein the local data comprises environmental parameter values measured by the first data collection device while within the receiving range of the building environmental sensor;
    compare the local data to sensor data captured by the sensing element to determine whether the local data and the data captured by the sensing element are consistent with each other; and
    when the local data and the data captured by the sensing element are not consistent with each other, generate a signal indicating that the building environmental sensor, the data collection device, or both may require maintenance.

4. The building environmental sensor of claim 1, wherein the building environmental sensor comprises a temperature sensor and the sensing element comprises one or more of the following:
   a thermocouple;
   a bi-metallic thermostat;
   a thermistor; or
   a resistive temperature detector.

5. The building environmental sensor of claim 1, wherein the building environmental sensor comprises a humidity sensor and the sensing element comprises a strip of metal oxide that is positioned between two electrodes.

6. The building environmental sensor of claim 1, wherein the building environmental sensor comprises a gas detection sensor and the sensing element comprises one or more of the following:
   an electrochemical sensor with sensing electrodes;
   an infrared transmitter and receiver; or
   a catalytic sensor with a coil that will oxidize when it contacts a combustible gas.

7. The building environmental sensor of claim 1, wherein the building environmental sensor comprises a motion sensor and the sensing element comprises a passive infrared transmitter and receiver.

8. The building environmental sensor of claim 1, wherein the first data collection device and the second data collection device are the same device.

9. A method of operating a building environmental sensor, the method comprising, by a building environmental sensor:
   using a sensing element to collecting measurements of one or more of the following parameters of an environment: temperature, humidity, light, sound or the absence or presence of a gas;
   storing the collected measurements in a data store;
   detecting, in response to communicatively connecting with a first data collection device via a short-range communication or near-field communication (NFC) protocol, that the first data collection device is within a communication range of the building environmental sensor;
   generating a first data stream that includes the collected measurements;
   transmitting the first data stream to a first data collection device;
   determining that a communication link between the building environmental sensor and the first data collection device was lost before the first data stream was fully transmitted to the first data collection device;
   saving an indicator that identifies remaining data in the data store that was not delivered to the first data collection device;
   detecting, in response to communicatively connecting with a second data collection device via the short-range communication or NFC protocol, that the second data collection device is within the communication range of the building environmental sensor;
   generating a second data stream that includes the remaining data; and
   transmitting the second data stream to the second data collection device.

10. The method of claim 9 further comprising, by the sensor:
   generating a message that includes an indicator that a second data collection device can use to determine when the first data collection device has received a complete transmission of the data stored in the data store; and
   including the message in the first data stream.

11. The method of claim 9 further comprising, by the building environmental sensor:
   receiving local data from an onboard environmental sensor of the first data collection device, wherein the local data comprises environmental parameter values measured by the first data collection device while within the receiving range of the building environmental sensor;
   comparing the local data to sensor data captured by the building environmental sensor to determine whether the local data and the data captured by the building environmental sensor are consistent with each other; and
   when the local data and the data captured by the building environmental sensor are not consistent with each other, generating a signal indicating that the building environmental sensor, the data collection device, or both may require maintenance.

12. The method of claim 9, wherein the building environmental sensor comprises a temperature sensor with a sensing element that comprises one or more of the following:
   a thermocouple;
   a bi-metallic thermostat;
   a thermistor; or
   a resistive temperature detector.

13. The method of claim 9, wherein the building environmental sensor comprises a humidity sensor with a sensing element that comprises a strip of metal oxide that is positioned between two electrodes.

14. The method of claim 9, wherein the building environmental sensor comprises a gas detection sensor with a sensing element that comprises one or more of the following:
   an electrochemical sensor with sensing electrodes;
   an infrared transmitter and receiver; or
   a catalytic sensor with a coil that will oxidize when it contacts a combustible gas.

15. The system of claim 9, wherein the building environmental sensor comprises a motion sensor with a sensing element that comprises a passive infrared transmitter and receiver.

16. The method of claim 9, wherein the first data collection device and the second data collection device are the same device.

17. The building environmental sensor of claim 1, wherein:
   the programming instructions to detect that the first data collection device is within the communication range of the sensor further comprise instructions to detect that the first data collection device is within the communication range in response to:
     detecting a first pairing signal from the first data collection device, or
     receiving a first query message from the first data collection device, wherein the first query message requests data from the sensor; and
   the programming instructions to detect that the second data collection device is within the communication range of the sensor further comprise instructions to detect that the second data collection device is within the communication range in response to:
     detecting a second pairing signal from the second data collection device, or receiving a second query message from the second data collection device, wherein the second query message requests data from the sensor.

18. The method of claim 9, wherein:

detecting that the first data collection device is within the communication range of the sensor further comprises:
  detecting a first pairing signal from the first data collection device, or
  receiving a first query message from the first data collection device, wherein the first query message requests data from the sensor; and detecting that the second data collection device is within the communication range of the sensor further comprises:
  detecting a second pairing signal from the second data collection device, or
  receiving a second query message from the second data collection device, wherein the second query message requests data from the sensor.

* * * * *